US012627158B2

(12) United States Patent
Au et al.

(10) Patent No.: US 12,627,158 B2
(45) Date of Patent: May 12, 2026

(54) SYSTEMS AND METHODS OF DC POWER CONVERSION AND TRANSMISSION FOR SOLAR FIELDS

(71) Applicant: Nextpower LLC, Fremont, CA (US)

(72) Inventors: Alexander W. Au, Oakland, CA (US); Yang Liu, Mountain View, CA (US)

(73) Assignee: NEXTPOWER LLC, Fremont, CA (US)

( * ) Notice: Subject to any disclaimer, the term of this patent is extended or adjusted under 35 U.S.C. 154(b) by 17 days.

(21) Appl. No.: 17/948,878

(22) Filed: Sep. 20, 2022

(65) Prior Publication Data

US 2023/0012720 A1     Jan. 19, 2023

Related U.S. Application Data

(63) Continuation of application No. 16/402,695, filed on May 3, 2019, now Pat. No. 11,451,052.

(Continued)

(51) Int. Cl.
    *H02J 7/35*        (2006.01)
    *H02J 1/10*        (2006.01)
    (Continued)

(52) U.S. Cl.
    CPC ................ *H02J 7/35* (2013.01); *H02J 1/102* (2013.01); *H02J 3/32* (2013.01); *H02J 3/381* (2013.01);
    (Continued)

(58) Field of Classification Search
    CPC ........ H02J 1/10; H02J 7/00; H02J 7/35; H02J 7/38; H02J 7/0013; H02J 1/082;
    (Continued)

(56) References Cited

U.S. PATENT DOCUMENTS 5,659,465 A *   8/1997   Flack .................... H02J 7/0013
                                363/79
7,248,490 B2     7/2007   Olsen et al.
        (Continued)

FOREIGN PATENT DOCUMENTS

| CN | 201976034 U | 9/2011 |
|----|-------------|--------|
| CN | 102484364 A | 5/2012 |

(Continued)

OTHER PUBLICATIONS

Examination Report issued in Australian Patent Application No. 2022203915 dated Feb. 21, 2023.

(Continued)

*Primary Examiner* — Daniel Cavallari
*Assistant Examiner* — Terrence R Willoughby
(74) *Attorney, Agent, or Firm* — Fredrikson & Byron, P.A.

(57) ABSTRACT

Systems and methods integrate advanced solar tracker, battery, inverter, and software technologies to improve performance, plant output, and costs. The systems may incorporate an advanced vanadium flow battery (VFB) that is DC-voltage (DV)-coupled to photovoltaic (PV) arrays for high, round-trip efficiency. The systems incorporate a DC architecture that optimizes performance for commercial, industrial, agricultural, and utility applications. A distributed direct current (DC) power system includes a centralized, single-stage inverter; PV arrays; maximum power point tracking (MPPT) converters coupled between the PV arrays and the centralized, single-stage inverter; batteries; and DC-DC battery converters (DCBCs) coupled to the batteries. The MPPT converters maximize solar power production by the PV arrays and minimize mismatch between the PV arrays. The DCBCs manage charge and discharge of the batteries, enable the interconnection of the PV arrays and the (Continued)

batteries, and supply a constant medium voltage to the central inverter.

16 Claims, 8 Drawing Sheets

Related U.S. Application Data

(60) Provisional application No. 62/667,960, filed on May 7, 2018, provisional application No. 62/667,129, filed on May 4, 2018.

(51) Int. Cl.

| | |
|---|---|
| *H02J 1/102* | (2026.01) |
| *H02J 3/32* | (2006.01) |
| *H02J 3/38* | (2006.01) |
| *H02J 3/388* | (2026.01) |
| *H02J 3/46* | (2006.01) |
| *H02J 7/00* | (2006.01) |
| *H02S 40/32* | (2014.01) |
| *H02S 40/36* | (2014.01) |
| *H02S 40/38* | (2014.01) |

(52) U.S. Cl.
CPC ............... *H02J 3/388* (2020.01); *H02J 3/46* (2013.01); *H02J 7/0013* (2013.01); *H02S 40/32* (2014.12); *H02S 40/36* (2014.12); *H02S 40/38* (2014.12); *H02J 1/106* (2020.01); *H02J 2300/26* (2020.01)

(58) Field of Classification Search
CPC .. H02J 1/109; H02J 3/46; H02S 40/32; H02S 40/34; H02S 40/38; H02S 40/36
USPC ............................ 320/101, 104, 122; 307/9.1
See application file for complete search history.

(56) References Cited

U.S. PATENT DOCUMENTS

| | | | |
|---|---|---|---|
| 8,427,009 | B2 | 4/2013 | Shaver et al. |
| 8,929,038 | B2 | 1/2015 | Strobl et al. |
| 9,093,845 | B2 | 7/2015 | Triebel et al. |
| 9,263,895 | B2 | 2/2016 | Naiknaware et al. |
| 9,654,028 | B1 | 5/2017 | Luo et al. |
| 9,680,304 | B2 | 6/2017 | Adest et al. |
| 2002/0076851 | A1 | 6/2002 | Eden et al. |
| 2008/0143188 | A1 | 6/2008 | Adest et al. |
| 2008/0238195 | A1 | 10/2008 | Shaver et al. |
| 2011/0045332 | A1 | 2/2011 | Horne et al. |
| 2011/0084553 | A1 | 4/2011 | Adest et al. |
| 2011/0133556 | A1 | 6/2011 | Choi |
| 2011/0140535 | A1 | 6/2011 | Choi et al. |
| 2012/0019966 | A1 | 1/2012 | Deboer |
| 2012/0319489 | A1 | 12/2012 | McCaslin et al. |
| 2013/0194706 | A1 | 8/2013 | Har-Shai et al. |
| 2014/0084872 | A1* | 3/2014 | Iida ...................... H02J 7/00711 |
| | | | 320/126 |

| | | | |
|---|---|---|---|
| 2014/0195177 | A1 | 7/2014 | Kang et al. |
| 2014/0203649 | A1* | 7/2014 | Cheek ..................... H02J 9/066 |
| | | | 307/64 |
| 2014/0217827 | A1 | 8/2014 | Cheek et al. |
| 2015/0098251 | A1 | 4/2015 | Harrison et al. |
| 2015/0145328 | A1 | 5/2015 | Ohshima et al. |
| 2015/0229131 | A1* | 8/2015 | Gerhardinger ........... H02J 3/46 |
| | | | 307/22 |
| 2015/0309104 | A1 | 10/2015 | Möll et al. |
| 2015/0343911 | A1 | 12/2015 | White et al. |
| 2015/0349708 | A1 | 12/2015 | Moslehi |
| 2016/0065127 | A1 | 3/2016 | Newdoll et al. |
| 2016/0344231 | A1 | 11/2016 | Bridwell |
| 2016/0352229 | A1 | 12/2016 | Norimatsu et al. |
| 2017/0047742 | A1* | 2/2017 | Narla ...................... H02J 3/381 |
| 2017/0077709 | A1* | 3/2017 | Kim ........................ H02J 3/381 |
| 2017/0093187 | A1 | 3/2017 | Park et al. |
| 2018/0097452 | A1 | 4/2018 | Chapman et al. |
| 2018/0110150 | A1* | 4/2018 | Blanchet ................. H02J 3/381 |
| 2018/0152131 | A1 | 5/2018 | Vidhi et al. |
| 2018/0264955 | A1 | 9/2018 | Gupta |
| 2019/0044428 | A1 | 2/2019 | Okumura et al. |
| 2019/0273382 | A1* | 9/2019 | Zhang ..................... H02J 3/381 |
| 2019/0334349 | A1* | 10/2019 | Liu ......................... H02J 3/381 |
| 2020/0059099 | A1* | 2/2020 | Turena ..................... H02J 3/38 |

FOREIGN PATENT DOCUMENTS

| | | |
|---|---|---|
| CN | 104662484 A | 5/2015 |
| CN | 105637758 A | 6/2016 |
| DE | 10136147 A1 | 2/2003 |
| DE | 102011110197 A1 | 3/2012 |
| EP | 2437387 A2 | 4/2012 |
| JP | 3493644 B2 | 2/2004 |
| WO | 2008132551 A2 | 11/2008 |
| WO | 2010130273 A1 | 11/2010 |
| WO | 2012162570 A1 | 11/2012 |
| WO | 2017065870 A1 | 4/2017 |

OTHER PUBLICATIONS

Examination Report No. 1 issued in Australian Patent Application 2019262602 dated Apr. 15, 2021, 5 pages.

Extended European Search Report issued in European Patent Application No. 19795799.6 dated Dec. 22, 2021, 13 pages.

First Examination Report issued in Indian Patent Application No. 202027052622 dated Sep. 22, 2021, 7 pages.

Notice of Acceptance issued in Australian Application No. 2019262602 dated Feb. 24, 2022.

PCT Search Report and Written Opinion issued in corresponding PCT Application No. PCT/US2019/030636 dated Aug. 27, 2019, 13 pages.

Yang Zilong et al: "Topology and control of transformerless high voltage grid-connected PV systems with a cascade step-up structure", IECON 2017—43rd Annual Conference of Theieee Industrial Electronics Society, Oct. 29, 2017 (Oct. 29, 2017), pp. 4239-4244.

Euorpean Patent Office, "Extended European Search Report" From Application No. 24182540.5, Dated Nov. 25, 2024, pp. 13.

\* cited by examiner

SYSTEMS AND METHODS OF DC POWER CONVERSION AND TRANSMISSION FOR SOLAR FIELDS

CROSS-REFERENCE TO RELATED APPLICATIONS

This application is a continuation of U.S. patent application Ser. No. 16/402,695 filed May 3, 2019, which claims benefit of and priority to U.S. Provisional Application No. 62/667,960 filed May 7, 2018 and 62/667,129 filed May 4, 2018, the disclosures of each of the above-identified applications are hereby incorporated by reference in their entirety.

FIELD

This disclosure is generally directed to solar power generating systems. More particularly, this disclosure is directed to solar power systems and methods utilizing distributed DC-DC battery converters, DC power transmission, and centralized power inversion.

BACKGROUND

Solar and wind energy are increasingly important renewable, non-polluting energy sources for consumers and businesses throughout the world. For solar energy, photovoltaic (PV) panels arranged in an array or string typically provide the means to convert solar energy into electrical energy. In operating photovoltaic (PV) arrays, maximum power point tracking (MPPT) is generally used to automatically determine a voltage or current at which the PV array should operate to generate a maximum power output for a particular temperature and solar irradiance. Although MPPT allows for the generation of maximum output power, the transmission and storage of the power generated by the PV arrays may be inefficient and costly.

SUMMARY

In one aspect, this disclosure features a distributed direct current (DC) power system. The distributed direct current (DC) power system includes a centralized inverter to invert DC to alternating current (AC); photovoltaic (PV) strings; maximum power point tracking (MPPT) converters coupled between the photovoltaic PV strings, respectively, and the centralized inverter; batteries; and DC-DC battery converters (DCBC) coupled to the batteries. The MPPT converters maximize solar power production by the PV strings and minimize mismatch between the PV strings. The DCBCs manage charge and discharge of the batteries and enable the interconnection of the PV strings and the batteries.

In aspects, the distributed DC power system also includes battery management controllers coupled between the batteries and the DCBCs, respectively. The battery management controllers are configured to start-up the DCBCs.

In aspects, the batteries are flow battery stacks and the distributed DC power system also includes a battery management controller coupled between at least one flow battery stack of the flow battery stacks and a DCBC of the DCBCs. In aspects, the batteries are vanadium flow batteries.

In aspects, the distributed DC power system also includes a PV combiner coupled to the PV strings and including disconnect switches and an arc fault detector coupled to the outputs of the disconnect switches. In aspects, the distributed DC power system also includes fuses coupled between the PV strings and the disconnect switches, respectively.

In aspects, the distributed DC power system also includes disconnect switches coupled to outputs of the PV strings, respectively, and arc fault detectors coupled to outputs of the disconnect switches, respectively. The MPPT converters are coupled to the outputs of the arc fault detectors, respectively.

In aspects, the distributed DC power system also includes a network control unit in wired or wireless communication with each of the MPPT converters and each of the DCBCs. The network control unit manages the operation of the MPPT converters and the DCBCs.

In aspects, the centralized inverter includes silicon carbide (SiC) metal-oxide-semiconductor field-effect transistors (MOSFETs). In aspects, the centralized inverter is a single-stage inverter.

In another aspect, this disclosure features a method of controlling a distributed direct current (DC) power system. The method includes maintaining a constant predetermined medium voltage at an input to a centralized inverter; operating DC-DC battery converters (DCBC) coupled to batteries, respectively, in a constant voltage mode; in response to the startup of the batteries, operating the DC-DC battery converters (DCBC) in a constant power mode; and in response to a reduction of charge or discharge current, operating the DC-DC battery converters (DCBC) in the constant voltage mode.

In aspects, the method also includes exporting, by maximum power point tracking (MPPT) converters, power to a DC distribution bus.

In aspects, the constant predetermined medium voltage is between 1200 V and 1600 V.

BRIEF DESCRIPTION OF THE DRAWINGS

Various aspects of the present disclosure are described herein below with reference to the drawings, which are incorporated in and constitute a part of this specification, wherein.

DETAILED DESCRIPTION

The solar power systems of this disclosure incorporate centralized AC inversion, distributed DC solar, and storage power management. The distributed DC power system includes the following components:

1. A centralized or central inverter 102 for power inversion from DC to AC;
2. Distributed MPPT converters 112a-112n to maximize solar power production and minimize mismatch between DC solar strings; and 3. Distributed DC-DC battery converters (DCBCs) manage battery charge and discharge as well as enable the interconnection of DC-coupled PV strings and the batteries This architecture dedicates power electronics components for PV, battery, and grid connection, allowing flexibility in component selection based on specific PV-to-storage sizing ratios. The sizing is independent of grid interconnection capacity requirements and/or constraints.

Figure 1:
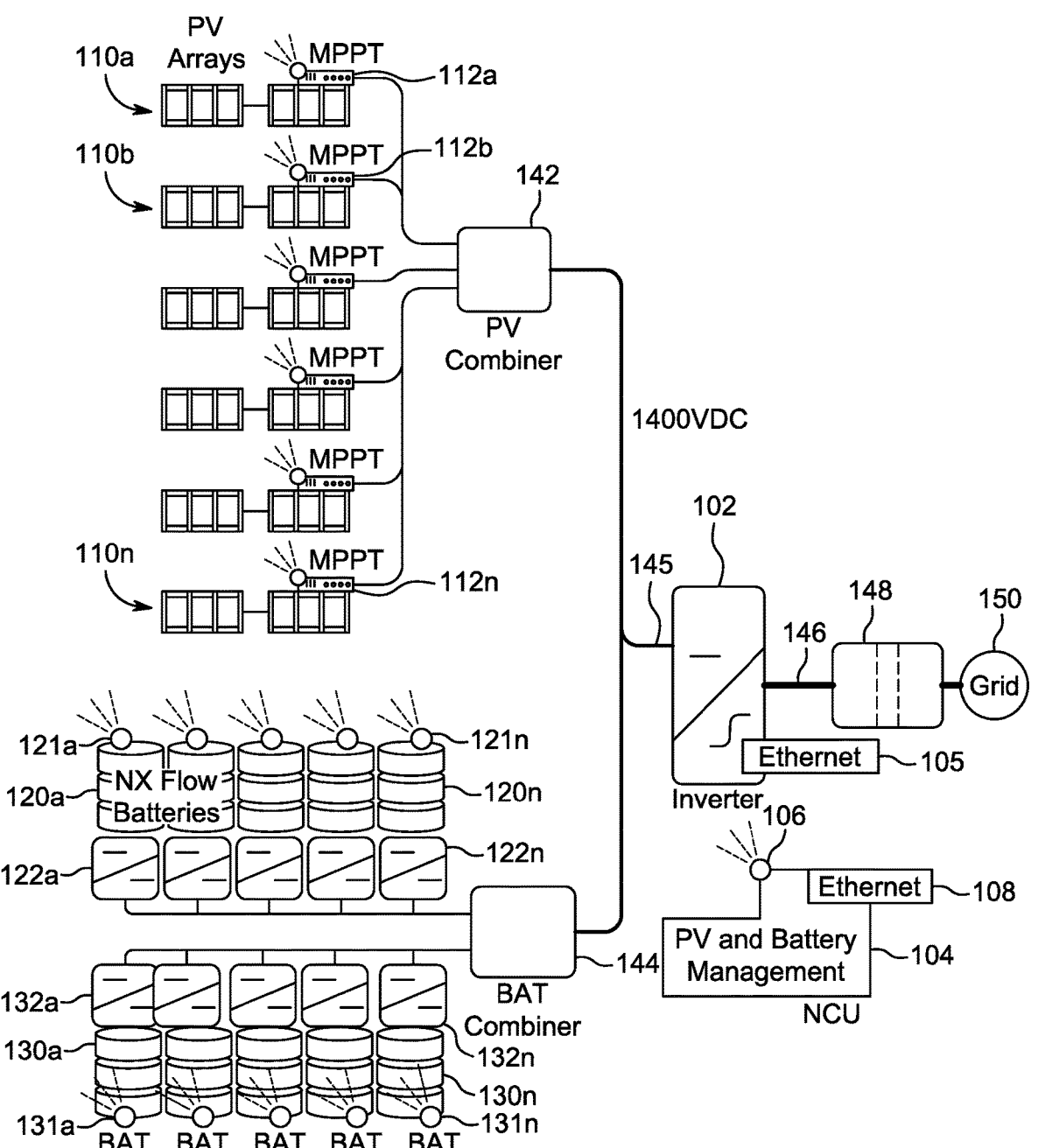
FIG. 1 is a schematic diagram of a central inverter and a distributed DC battery management system according to an embodiment of this disclosure.

FIG. 1 depicts an example power system of this disclosure. The power system includes a central inverter 102 and distributed DC battery management components. The central inverter 102 may be a single-stage inverter incorporating three pairs transistors, e.g., silicon carbide (SiC) metal-oxide-semiconductor field-effect transistors (MOSFETs), electrically connected in parallel. Since the cost of SiC MOSFETs has decreased, the central inverter 102 can be a cost-effective, high-voltage, and low-current device. The central inverter 102 may also incorporate a filter, e.g., an RL filter, connected to the outputs of the transistors. The central inverter 102 may be connected to a controller (not shown), which may use a pulse width modulation (PWM) technique, e.g., sinusoidal (PWM), to control the SiC MOSFETs. The central inverter 102 is electrically connected to a grid 150 (e.g., a utility grid) via an AC power line 146 and a transformer 148.

The power system of FIG. 1 also includes a network control unit (NCU) 104. The NCU 104 is designed to communicate with the customer and provide site-level energy management commands via a wireless communication device 106 or a wired communication device, e.g., an Ethernet communications interface 108. The NCU 104 also communicates with DC-DC battery converters (DCBCs) 122a-122n, 132a-132n via respective wireless communication devices 121a-121n, 131a-131n, and with each PV maximum power point tracking (MPPT) converter unit 112a, 112b, . . . , 112n. The NCU 104 also coordinates with the central inverter 102 for overall system start-up and shut-down. The central inverter 102 may include an Ethernet communications interface 105 through which the NCU may communicate with the central inverter 102. The system may include distributed Tracker-level Power Optimizer (TPO) converters (e.g., TPO system 900) to maximize solar power production and minimize the mismatch between PV strings or arrays 110a-110n.

Figures 2, 3:
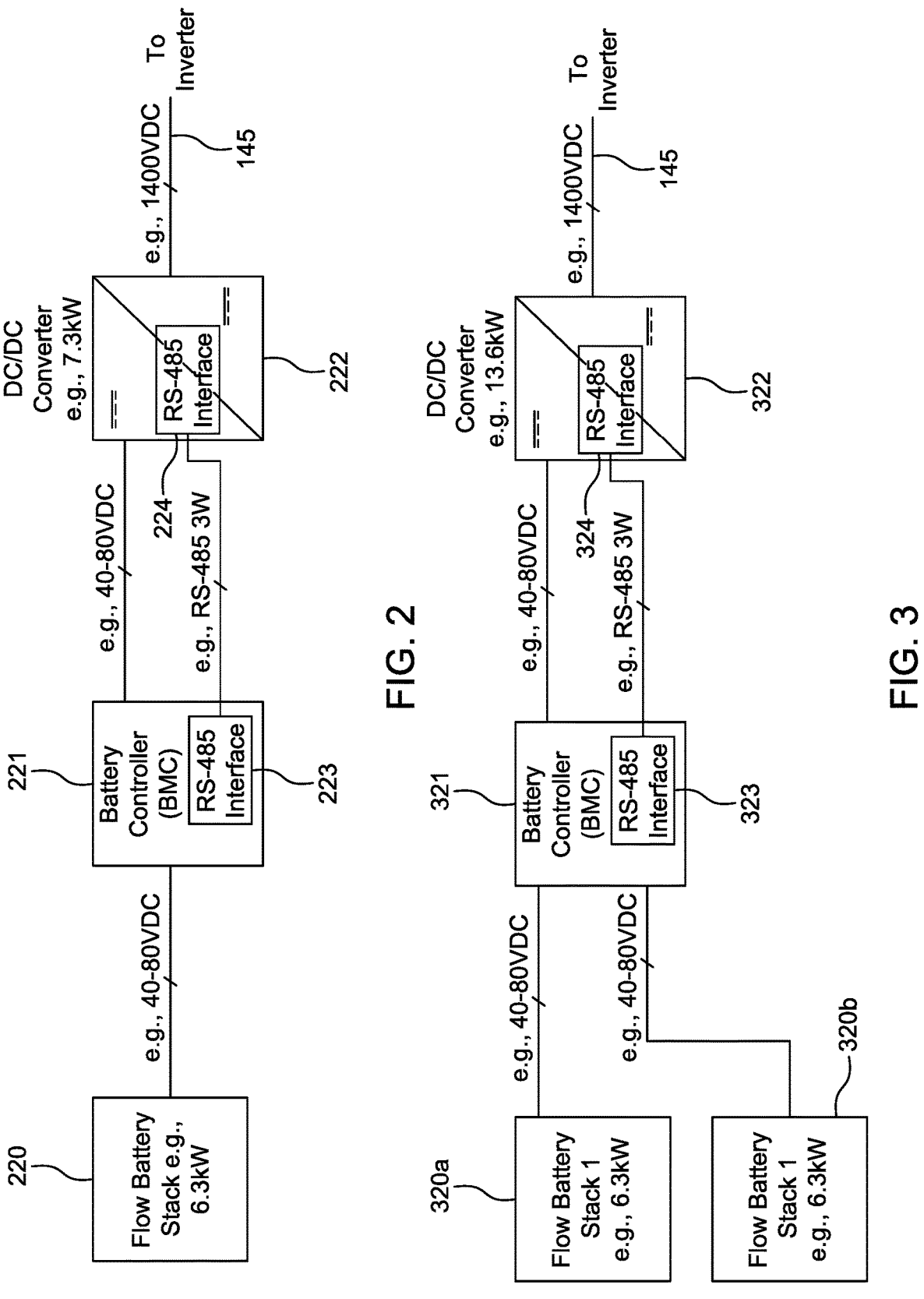
FIGS. 2 and 3 are schematic diagrams of DC-DC battery converters according to embodiments of this disclosure.

FIGS. 2 and 3 depict two different DC-DC battery converters (DCBCs) 222, 322. DCBC 322 is configured for multiple flow battery stacks 320a, 320b and thus has a higher power rating than DCBC 222. In embodiments, the DCBC 222 is a 7.3 kW solution and the DCBC 322 is a 13.6 kW solution. Example specifications for the DC-DC battery converters 222, 322 are depicted in Table 1 below:

TABLE 1

Example DCBC Specifications

| Electrical | |
| --- | --- |
| Isolation | Galvanic isolation >2500 VDC |
| Nominal Power | Option 1 7.6 kW |
| | Option 2 13.9 kW |
| Nominal Input Voltage | 40 to 80 VDC |
| Nominal Output voltage | 1400 VDC |
| Maximum Output Voltage | 1500 VDC |
| Maximum Input Current | Option 1 190 A |
| | Option 2 347 A |
| Efficiency | >96% |
| Input Current Ripple | <10 A |

TABLE 1-continued

Example DCBC Specifications

| Environmental | |
| --- | --- |
| Protection | Open frame or module, indoor |
| Cooling | Air-cooled |
| Operating Temperature | −20 to 60° C. |
| Storage Temperature | −20 to 60° C. |
| Operating Humidity | 0 to 100% |
| Operating Altitude | 0 to 3000 meters |
| Control Mode | Constant power, constant voltage |
| Physical | |
| Mounting | Flange Mount |
| Maximum Dimension | 330 × 550 × 100 mm |
| Weight | <15 kg |
| Transportation | IEC 60721-3-2 Class 2M2 |
| Communication | |
| Serial | RS485 (isolated), Modbus ETU |
| Compliance | |
| Regulatory | UL1741 Stand-alone |
| EMI | FCC Class A |

As shown in FIGS. 2 and 3, the DC-DC battery converters (DCBCs) 222, 322 charge and discharge flow battery stacks 220, 320a, 320b (e.g., vanadium flow battery (VFB) stacks) in response to external commands. These commands may be transmitted by battery management controllers 221, 321 via an RS-485 communications devices or interfaces 223, 323 to the DCBCs 222, 322 via an RS-485 communications devices or interfaces 224, 324, for example. A low-voltage side (e.g., 40-80 VDC) of the DCBC 222, 322 connects to the flow battery stacks 220, 320a, 320b, while the high-voltage side (e.g., a constant 1200-1600 VDC) connects to the DC distributed bus or DC bus 145, to which other DCBCs (e.g., DCBCs 122a-122n, 132a-132n) and solar MPPT converters 112a-112n are connected. In one embodiment, the voltage of the DC bus 145 is a nominal 1400 VDC. In other embodiments, the constant voltage of the DC bus is between 1200 VDC and 1600 VDC. As shown in FIG. 2, the NCU 104 may control the voltage of the DC bus 145 as a constant voltage source by sending control signals or messages to the BMCs 221, 321 of each of the DCBCs 122a-122n, 132a-132n via wireless communication devices 121a-121n, 131a-131n, which are connected to respective DCBCs 122a-122n, 132a-132n.

Figure 4:
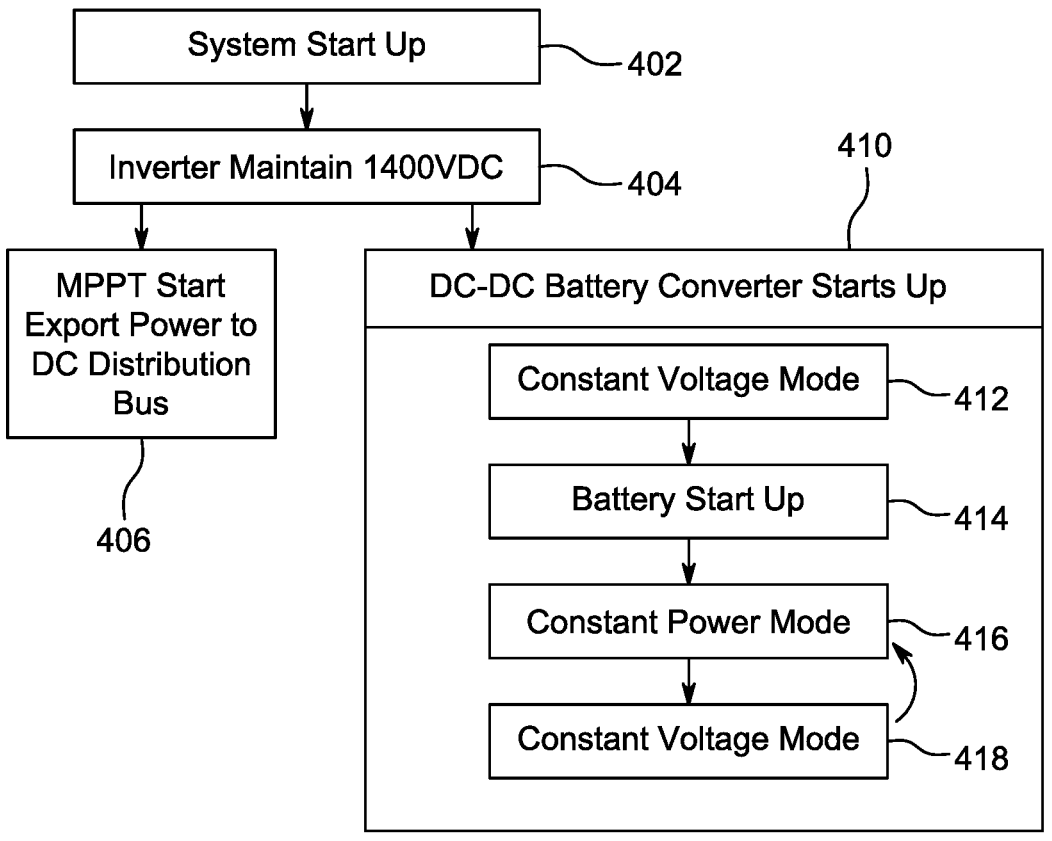
FIG. 4 is a flow diagram of a power system start-up sequence according to an embodiment of this disclosure.

FIG. 4 illustrates a power start-up sequence according to one implementation. While the system starts up, the central inverter 102 starts up first at block 402 and maintains a predetermined medium voltage, e.g., 1400 VDC, on the DC bus 145 at block 404. After the predetermined medium voltage is present on the DC bus 145, the MPPT converters 112a-112n start exporting power to the DC distribution bus or DC bus 145 at block 406, and track the maximum power of the PV arrays 110a-110n.

The start-up 410 of the DCBCs 122a-122n, 132a-132n is based on a command signal or message from the battery management controller (BMC), e.g., BMC 221 or BMC 321 of FIG. 3. Upon start-up, each DCBC 122a-122n, 132a-132n operates in a constant voltage mode at block 412. In one embodiment, the default start-up voltage may be 40 VDC. The BMC 221, 321 manages the battery initial charge at block 414. During this time, a maximum of 2 kW may be drawn from the DCBC low-voltage side. After the battery's initial charge, the DCBC changes to a constant power mode 416 based on a command signal or message from the BMC 221, 321. At the end of a charge or discharge cycle, charge or discharge current reduces, and the DCBC changes to a constant voltage mode at block 418. Thereafter, the DCBC repeats the constant power mode 416 and the constant voltage mode 418 for subsequent charge or discharge cycles.

While the DCBC 222, 322 operates in a constant voltage mode (e.g., at start-up) it may hold a constant low voltage, e.g., 40V, or a commanded voltage from the BMC 221, 321. Toward the end of a charge or discharge cycle, the DCBC 222, 322 may hold the constant voltage until the current reduces to zero.

Figure 5:
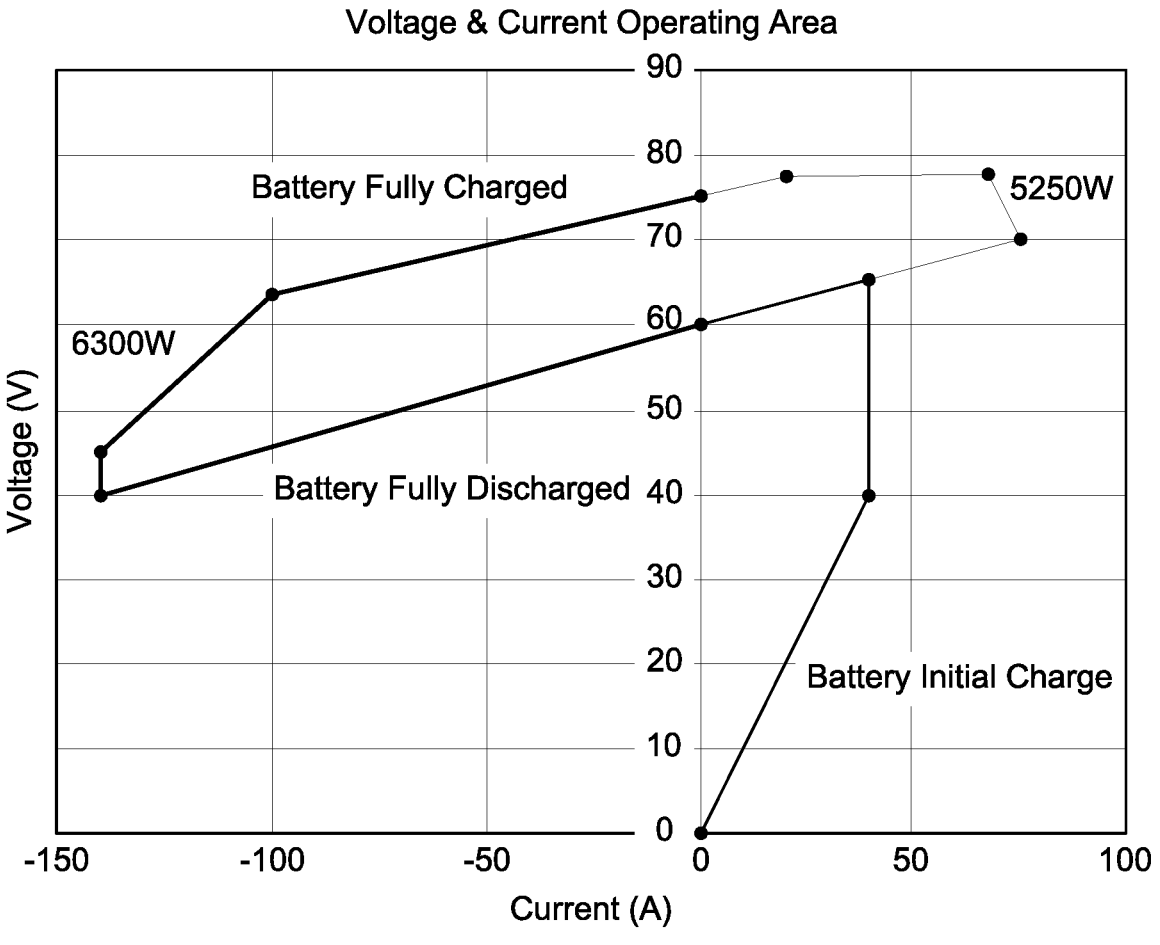
FIG. 5 is a graphical diagram illustrating a battery voltage and current operating curve for a single stack according to an embodiment of this disclosure.

FIG. 5 depicts a voltage and current operating curve during a constant power mode both during charging and discharging. In one embodiment, the DC-DC battery converters 222, 322 may operate through the full range of this curve. The DC-DC battery converters 222, 322 follow the power commands through the RS-485 communications interfaces or connections 224, 324. In some embodiments, approximately 1.3 kW of parasitic or auxiliary load may be required for the flow battery stacks 220, 320a, 320b.

In embodiments, the central or centralized inverter 102 may have a variety of specifications as depicted in Table 2 below:

TABLE 2

| Example Centralized Inverter Specifications | |
| --- | --- |
| Architecture | Bi-directional single stage power inversion |
| Nominal AC Power | >1 MW |
| Nominal AC Voltage | >600 VAC |
| Nominal Frequency | 50 Hz/60 Hz |
| Power Factor Support | >0.8 |
| Nominal DC Voltage | 1400 VDC (constant) |
| Maximum DC voltage | 1500 VDC |
| Communication Interface | RS485, Modbus RTU |
| Operating Temperature | −20 to 50° C. |
| Storage Temperature | −20 to 50° C. |
| Operating Humidity | 0 to 100% |
| Operating Altitude | 0 to 3000 meters |
| Enclosure Type | Outdoor 3R |
| Regulatory | UL1741SA, AS/NZ 4777.2, CE compliant, IEEE1547 (2018), IEC68150 |
| EMI | FCC Class A |

Power curtailment operations may be built into components of the system. For example, both the MPPTs 112a-112n and the DCBCs 122a-122n, 132a-132n (e.g., DCBCs 222, 322) have built-in power curtailment curves when the voltage of the DC bus 145 is above 1400 VDC. These curves linearly drop to zero when the voltage of the DC bus 145 is close to 1500 VDC. In one embodiment, the central inverter 102 raises the voltage of the DC bus 145 when the power curtailment command is received from the NCU 104 and or the grid 150, or the output power reaches the maximum allowable to power the grid 150. The central inverter 102 then resumes the constant 1400 VDC when the above conditions are cleared. In one embodiment, the NCU 104 communication with the TPO system 900 or SPCs 610, 710 and the DCBCs allows for constant power output during cloud cover independent of the control of the central inverter 102. In some embodiments, the outputs of the TPO system 900 and DCBCs may be designed to output a constant 1400 VDC nominal (1500 VDC maximum). The central inverter 102 also operates at constant input voltage. Standard PV combiner boxes (e.g., PV combiner 142 and battery combiner 144) may be used for combining both the PV arrays 110a-110n and the flow batteries 120a-120n, 130a-130n.

In embodiments, the solar power control system may be designed to operate for both on- and off-grid applications and may perform one or more functions including:

1. Grid voltage and frequency regulation;
2. Multiple inverters in parallel; and
3. Intentional islanding.

Figure 6:
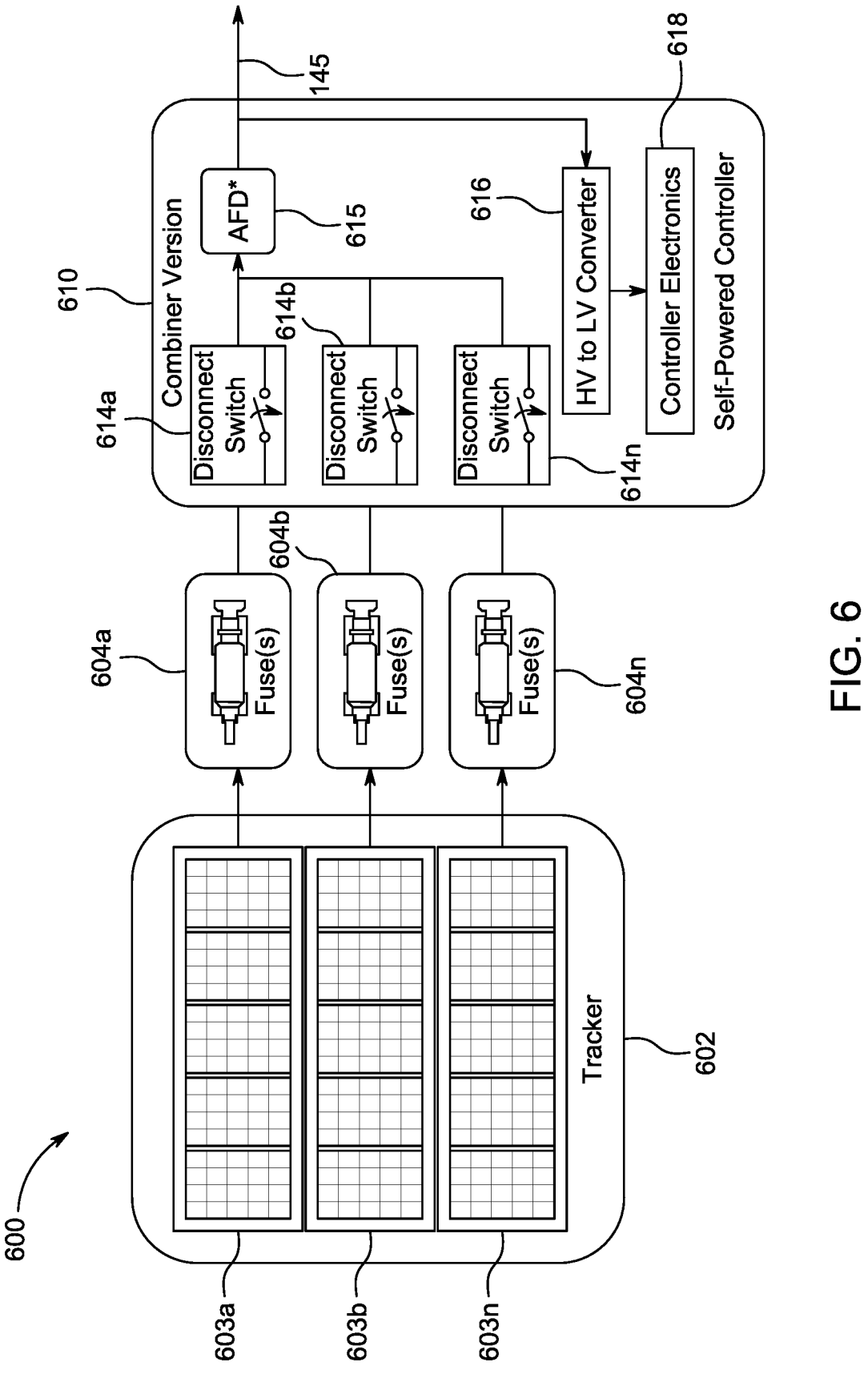
FIGS. 6 and 7 are schematic diagrams of control systems according to embodiments of this disclosure.

FIG. 6 depicts a combiner version of a solar tracker control system 600 according to an embodiment. The control system 600 includes a tracker 602 with PV arrays 603a-603n. The PV arrays 603a-603n are connected to respective fuses 604a-604n. The fuses 604a-604n, in turn, are connected to respective disconnect switches 614a-614n of the self-powered controller (SPC) 610, which may be implemented in the PV combiner 142 of FIG. 1. The outputs of the disconnect switches 614a-614n are connected together to an arc fault detector (AFD) 615, the output of which is provided to the central inverter 102 via the DC bus 145 of FIG. 1. The AFD 615 monitors and analyzes patterns in electrical current and/or voltage waveforms output from the PV arrays 603a-603n. When the AFD 615 senses a wave pattern indicating a potentially dangerous arc, the AFD 615 causes the disconnect switches 614a-614n to open.

The output from the arc fault detector 615 is also connected to a high voltage (HV) to low voltage (LV) converter 616, which converts the voltage on the DC bus 145 to a lower voltage, which is used to power the controller electronics 618. The controller electronics 618 may include driver circuitry (not shown) for driving an electric motor (not shown) of the solar tracker 602.

Figure 7:
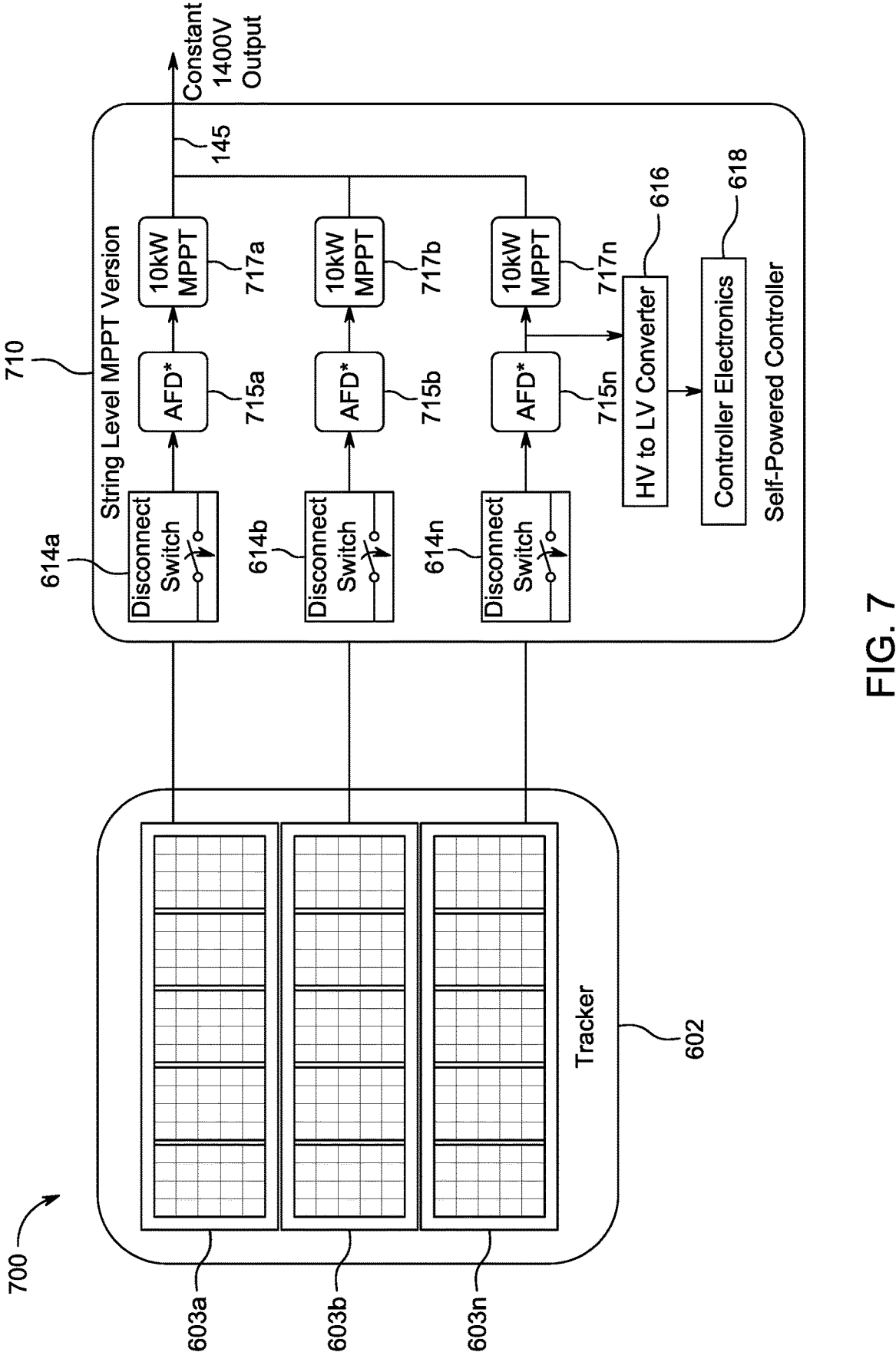

FIG. 7 depicts a string-level MPPT version of a solar tracker control system 700 according to another embodiment. The control system 700 includes a tracker 602 with PV arrays 603a-603n and a self-powered controller 710. The PV arrays 603a-603n are connected to respective disconnect switches 614a-614n. The disconnect switches 614a-614n, in turn, are connected to respective arc fault detectors 715a-715n. The arc fault detectors (AFDs) 715a-715n monitor and analyze patterns in electrical current and/or voltage waveforms output from respective PV arrays 603a-603n. When one or more of the AFDs 715a-715n sense a wave pattern indicating a potentially dangerous arc, one or more of the AFDs 715a-715n cause respective disconnect switches 614a-614n to open.

The arc fault detectors 715a-715n are connected to respective MPPT converters 717a-717n (e.g., 10 KW MPPT converters). The outputs of the MPPT converters 717a-717n are connected to the central inverter 102 via the DC bus 145 of FIG. 1. The output of the last arc fault detector 715n is also connected to a high voltage (HV) to low voltage (LV) converter 616, which converts the voltage output from the last PV string 603n to a lower voltage, which is used to power the controller electronics 618. Thus, the control system 700 features tracker-level power monitoring and string-level MPPT conversion (that is, the MPPT conversion is not just for each tracker 602 but for each of the PV strings or arrays 603a-603n).

Figure 8A:
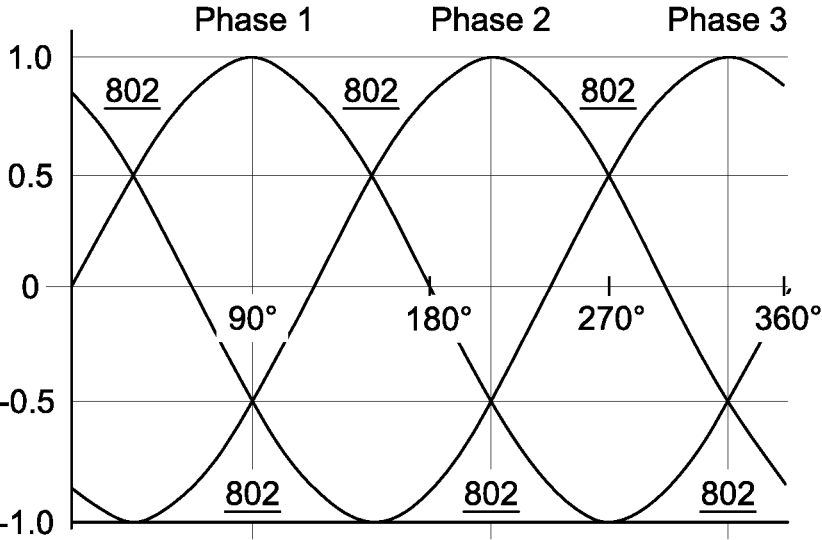
FIGS. 8A and 8B are graphs illustrating the benefits of DC power transmission.
Figure 8B:
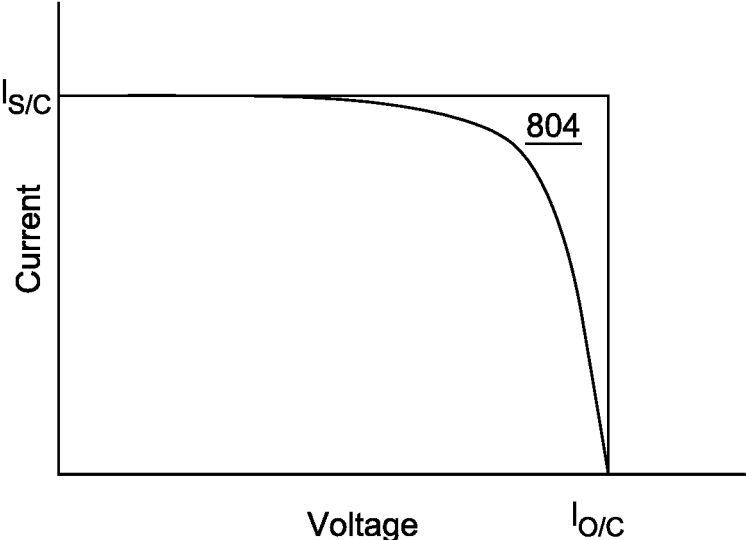

FIGS. 8A and 8B show graphs illustrating the benefits of constant direct current (DC) voltage transmission for a solar field. For the same voltage potential, DC is more efficient than AC for transmitting energy. As illustrated in the graph of FIG. 8A, the scaled three-phase AC waveform ranges between −1 V and +1 V. The differences between the scaled three-phase AC waveform and a constant +1 VDC or −1 VDC potential are shown as areas 802, which represent the efficiency gained from DC transmission. The energy generation in solar fields is DC for both solar and storage. All of the solar DC balance of system (BOS) are rated for both open circuit voltage Voc (for isolation) and short circuit current Isc (for the copper or conductor).

As illustrated in the graph of FIG. 8B, raising the transmission voltage close to the open circuit voltage Voc reduces approximately one third of the transmission current (represented by area 804) and eliminates approximately one third of the BOS cost. Also, maintaining constant voltage at the input to the centralized inverter 102 increases the capacity of the centralized inverter 102 by 20% to 50%. Further, a stable transmission voltage makes storage integration easier.

Figure 9:
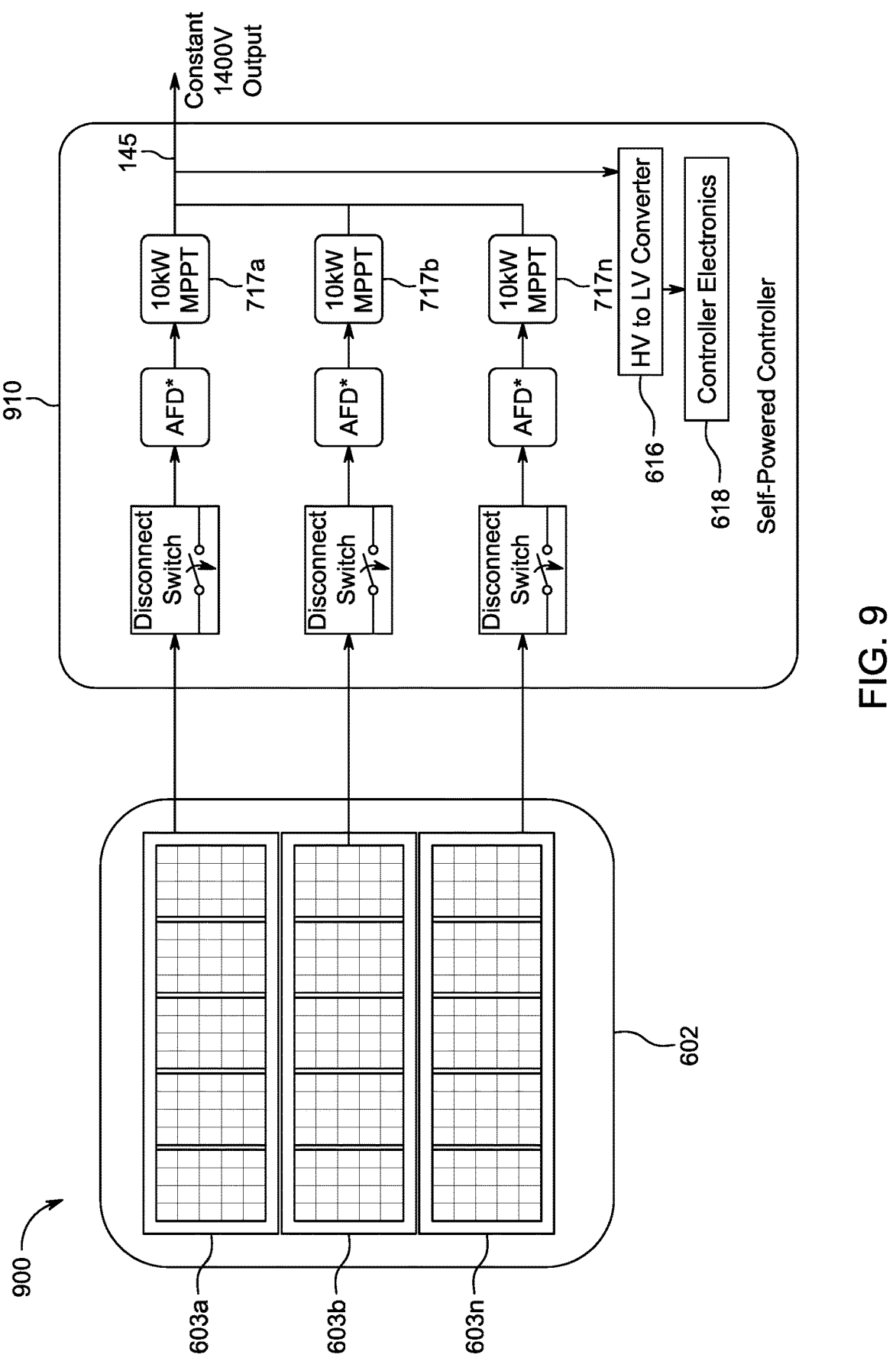
FIG. 9 is a schematic diagram of a control system according to another embodiment of this disclosure.

FIG. 9 depicts a tracker power optimizer (TPO) system 900 according to an embodiment. The TPO system 900 maximizes solar power production and minimizes the mismatch between PV arrays 110a-110n. The TPO system 900 does this by utilizing string-level maximum power point tracking (MPPT) 112a-112n. String-level MPPT eliminates the mismatch between PV strings or arrays 110a-110n, which, for bi-facial solar modules, increases row efficiency by 1-2%. Also, string-level power monitoring is easy for operations and maintenance (O&M), thereby reducing O&M cost and increasing power production of the solar site. And string-level power monitoring provides real-time open circuit detection and detection of shading for both east-west and north-south directions. The TPO system 900 may use energy from the PV arrays 110a-110n for moving or positioning the tracker 602, which provides maximum space utilization on the tracker 602. The SPC 910 of the TPO system 900 is similar to the SPC 810 of FIG. 8 except that the HV-to-LV converter 616 is connected to the combined outputs of the MPPT converters 717a-717n.

In the configurations of FIGS. 6, 7, and 9, the control systems 600, 700, and 900 output a constant medium voltage (e.g., 1200 V to 1600 V) to the centralized inverter 102. By providing a constant medium voltage to the centralized inverter 102, the capacity of the centralized inverter 102 is increased.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A distributed direct current (DC) power system comprising:

a common DC bus;

an inverter configured to invert DC power to alternating current (AC) power coupled to the common DC bus;

a plurality of tracking controllers coupled to a plurality of photovoltaic (PV) strings and coupled to the common DC bus, the plurality of tracking controllers configured to maximize solar power production of the plurality of PV strings and minimize mismatch between the plurality of PV strings;

a plurality of DC-DC battery converters (DCBCs) coupled to a plurality of batteries and to the common DC bus, the plurality of DCBCs configured to;

manage charge and discharge of the plurality of batteries;

enable interconnection of the plurality of PV strings and the plurality of batteries via the common DC bus; and maintain a constant DC voltage to at the inverter via the common DC bus;

wherein the common DC bus connects the plurality of tracking controllers and the plurality of DCBCs to each other and connects the plurality of tracking controllers and the plurality of DCBCs to the inverter.

2. The distributed DC power system of claim 1, further comprising a plurality of battery management controllers coupled between the plurality of batteries and the plurality of DCBCs, respectively, the plurality of battery management controllers configured to start up the plurality of DCBCs.

3. The distributed DC power system of claim 1, wherein the plurality of batteries is a plurality of flow battery stacks, further comprising a battery management controller coupled between at least one flow battery stack of the plurality of flow battery stacks and a DCBC of the plurality of DCBCs.

4. The distributed DC power system of claim 1, wherein the plurality of batteries are vanadium flow batteries.

5. The distributed DC power system of claim 1, further comprising a PV combiner coupled to the plurality of PV strings and including a plurality of disconnect switches and an arc fault detector coupled to outputs of the plurality of disconnect switches.

6. The distributed DC power system of claim 5, further comprising a plurality of fuses coupled between the plurality of PV strings and the plurality of disconnect switches, respectively.

7. The distributed DC power system of claim 1, further comprising:

a plurality of disconnect switches coupled to outputs of the plurality of PV strings, respectively; and a plurality of arc fault detectors coupled to outputs of the plurality of disconnect switches, respectively, wherein the plurality of tracking controllers are coupled to outputs of a plurality of arc fault detectors, respectively.

8. The distributed DC power system of claim 1, wherein the inverter includes a plurality of silicon carbide (SiC) metal-oxide-semiconductor field-effect transistors (MOSFETs).

9. The distributed DC power system of claim 1, wherein the inverter is a single-stage inverter.

10. The distributed DC power system of claim 1, wherein the plurality of tracking controllers includes a plurality of maximum power point tracking (MPPT) converters, respectively.

11. The distributed DC power system of claim 1, further comprising a network control unit (NCU) in communication with each of the plurality of tracking controllers and each of the plurality of DCBCs, the NCU configured to control the plurality of DCBCs to maintain the constant DC voltage at the inverter.

12. A method of controlling a distributed direct current (DC) power system, the method comprising:

maintaining a constant predetermined DC voltage on a DC bus connected to an inverter;

operating a plurality of DC-DC battery converters (DCBCs) in a constant voltage mode, each of the plurality of DCBCs being coupled to one or more batteries and coupled to the DC bus;

charging the one or more batteries coupled to each DCBC to an initial charge;

in response to the one or more batteries being charged to the initial charge, operating the plurality of DCBCs in a constant power mode, the constant power mode being distinct from the constant voltage mode; and in response to a reduction of charge or discharge current of the one or more batteries, operating the plurality of DCBCs in the constant voltage mode.

13. The method of claim 12, further comprising exporting, by a plurality of maximum power point tracking (MPPT) converters, power to a DC distribution bus.

14. The method of claim 12, wherein the constant predetermined voltage is between 1200 V and 1600 V.

15. The method of claim 12, wherein operating the plurality of DCBCs in a constant power mode comprises controlling the plurality of DCBCs to charge the one or more batteries coupled to each DCBC at a constant power.

16. A method of controlling a distributed direct current (DC) power system, the method comprising:

exporting, by a plurality of maximum power point tracking (MPPT) converters, power to a DC bus, the DC bus connected as an input to an inverter;

maintaining a constant predetermined DC voltage on the DC bus;

operating a plurality of DC-DC battery converters (DCBCs) in a constant voltage mode, each of the DCBCs being coupled to one or more batteries and coupled to the DC bus;

charging the one or more batteries coupled to each DCBC to an initial charge;

in response to the one or more batteries being charged to the initial charge, operating the plurality of DCBCs in a constant power mode; and in response to a reduction of charge or discharge current of the one or more batteries, operating the plurality of DCBCs in the constant voltage mode.

* * * * *